United States Patent
Hoehne et al.

(10) Patent No.: US 9,717,032 B2
(45) Date of Patent: Jul. 25, 2017

(54) TRANSFER FROM ACCESS POINTS OUTSIDE OF A RADIO ACCESS NETWORK

(71) Applicant: Nokia Solutions and Networks Oy, Espoo (FI)

(72) Inventors: Hans Thomas Hoehne, Helsinki (FI); Jeroen Wigard, Klarup (DK); Antti Anton Toskala, Espoo (FI); Colin Willcock, Nurtingen (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/761,796

(22) PCT Filed: Dec. 19, 2013

(86) PCT No.: PCT/EP2013/077289
§ 371 (c)(1),
(2) Date: Jul. 17, 2015

(87) PCT Pub. No.: WO2014/111223
PCT Pub. Date: Jul. 24, 2014

(65) Prior Publication Data
US 2015/0365873 A1    Dec. 17, 2015

(30) Foreign Application Priority Data
Jan. 18, 2013  (EP) .................. PCT/EP2013/050921

(51) Int. Cl.
*H04W 36/00*    (2009.01)
*H04W 36/30*    (2009.01)
*H04W 24/10*    (2009.01)
*H04W 36/14*    (2009.01)
*H04W 36/22*    (2009.01)
*H04W 88/06*    (2009.01)

(52) U.S. Cl.
CPC ........... *H04W 36/30* (2013.01); *H04W 24/10* (2013.01); *H04W 36/14* (2013.01); *H04W 36/22* (2013.01); *H04W 88/06* (2013.01)

(58) Field of Classification Search
CPC .............................. H04W 36/30; H04W 36/08
USPC ............... 455/436, 442, 432.1, 435.1, 422.1; 370/331
See application file for complete search history.

(56) References Cited

U.S. PATENT DOCUMENTS

| | | | |
|---|---|---|---|
| 7,009,952 B1 | 3/2006 | Razavilar et al. | 370/331 |
| 8,068,838 B1 | 11/2011 | Dinan et al. | 455/436 |
| 2003/0193910 A1 | 10/2003 | Shoaib et al. | 370/331 |
| 2010/0304745 A1* | 12/2010 | Patel | H04W 52/143 455/435.1 |

(Continued)

FOREIGN PATENT DOCUMENTS

| | | |
|---|---|---|
| WO | WO 2010/104921 A1 | 9/2010 |
| WO | WO 2011/033173 A1 | 3/2011 |

*Primary Examiner* — Nghi H Ly
(74) *Attorney, Agent, or Firm* — Harrington & Smith (57) ABSTRACT

A technique, including estimating at a communication device a quality of service available to said communication device via a radio access network; making a comparison of the estimated quality of service against a quality of service currently achieved via an access point operating outside of the radio access network; and deciding whether or not to transfer from said access point to said radio access network at least partly with reference to the result of said comparison.

21 Claims, 4 Drawing Sheets

(56) References Cited

U.S. PATENT DOCUMENTS

2012/0099562 A1* 4/2012 Smadi ................... H04W 36/08
                                                          370/332
2012/0120922 A1   5/2012 Huang et al. ................. 370/332
2013/0079005 A1* 3/2013 Watanabe ......... H04W 36/0083
                                                         455/435.1

* cited by examiner

TRANSFER FROM ACCESS POINTS OUTSIDE OF A RADIO ACCESS NETWORK

The provision of services to a communication device can involve the transfer of the communication device between a radio access network and one or more access points outside of the radio access network.

There has been identified the problem of efficiently managing such transfers, particular transfers back to a radio access network from an access point outside of the radio access network.

There is hereby provided a method, comprising: estimating at a communication device a quality of service available to said communication device via a radio access network; making a comparison of the estimated quality of service against a quality of service currently achieved via an access point operating outside of the radio access network; and deciding whether or not to transfer from said access point to said radio access network at least partly with reference to the result of said comparison.

According to one embodiment, the method comprises: deciding to transfer from said access point to said radio access network only if the estimated quality of service is higher than the quality of service currently achieved via said access point by at least a predetermined amount.

According to one embodiment, the method comprises receiving information about said predetermined amount from the radio access network.

According to one embodiment, said estimating comprises estimating a level of throughput available to a communication device via a cell of said radio access network; and said comparison comprises a comparison of said estimated throughput level against a throughput level currently achieved via said access point.

According to one embodiment, said estimating a level of throughput available to a communication device is at least partly based on (a) measurements at said communication device of the quality of a downlink via said cell of said radio access network and (b) an indicator of the amount of resources available to UE via said cell.

According to one embodiment, said estimating a level of throughput available to a communication device is at least partly based on (a) measurements at said communication device of the quality of a downlink via said cell of said radio access network and (b) an indicator of the load of said cell.

According to one embodiment, the method comprises receiving said indicator of the load of said cell from said radio access network.

According to one embodiment, said indicator expresses the amount of unused resources for said cell as a fraction of the total amount of resources for said cell.

According to one embodiment, said estimating comprises estimating a round trip time in a cell of said radio access network; and said comparison comprises a comparison of said estimated round trip time against an actual round trip time via said access point.

According to one embodiment, the method further comprises: in the event of a transfer of said communication device from said access point to said radio access network, sending from said communication device to said radio access network information about the actual quality of service achieved via said access point.

According to one embodiment, the method further comprises: in the event of a decision at said communication device to transfer said communication device from said access point to said radio access network, sending from said communication device to said radio access network an indication that a request to transfer back to said radio access network is based on a comparison of said estimated quality of service against a quality of service achieved via said access point.

According to one embodiment, said radio access network and said access point operate according to different radio access technologies.

There is also hereby provided a method comprising: in a technique comprising making a decision at a communication device about when to transfer to a radio access network from an access point operating outside of the radio access network at least partly based on a indicator from the radio access network about the amount of resources available to said communication device via said cell: deciding at said radio access network on a value for said indicator at least partly with reference to feedback received at the radio access network about the actual quality of service provided by said access point.

According to one embodiment, the method comprises: determining from said feedback that said access point is not suitable for a handover; and setting said indicator to a value that is recognised by said communication device as an indication that said communication device is not to handover to said access point.

There is also hereby provided a method comprising: in a technique comprising making a decision at a communication device about when to transfer to a radio access network from an access point operating outside of the radio access network at least partly based on an estimate at the communication device of a quality of service available to said communication device via said radio access network: transmitting from said radio access network to said communication device signalling regarding a handover of said communication device from said radio access network to said access point, wherein said signalling is based on information received at the radio access network about past levels of quality of service achieved via said access point.

There is also hereby provided an apparatus comprising: a processor and memory including computer program code, wherein the memory and computer program code are configured to, with the processor, cause the apparatus to: estimate at a communication device a quality of service available to said communication device via a radio access network; make a comparison of the estimated quality of service against a quality of service currently achieved via an access point operating outside of the radio access network; and decide whether or not to transfer from said access point to said radio access network at least partly with reference to the result of said comparison.

According to one embodiment, the memory and computer program code are further configured to, with the processor, cause the apparatus to: decide to transfer from said access point to said radio access network only if the estimated quality of service is higher than the quality of service currently achieved via said access point by at least a predetermined amount.

According to one embodiment, the memory and computer program code are further configured to, with the processor, cause the apparatus to receive information about said predetermined amount from the radio access network.

According to one embodiment, said estimating comprises estimating a level of throughput available to a communication device via a cell of said radio access network; and said comparison comprises a comparison of said estimated throughput level against a throughput level currently achieved via said access point.

According to one embodiment, said estimating a level of throughput available to a communication device is at least partly based on (a) measurements at said communication device of the quality of a downlink via said cell of said radio access network and (b) an indicator of the amount of resources available to UE via said cell.

According to one embodiment, said estimating a level of throughput available to a communication device is at least partly based on (a) measurements at said communication device of the quality of a downlink via said cell of said radio access network and (b) an indicator of the load of said cell.

According to one embodiment, the memory and computer program code are further configured to, with the processor, cause the apparatus to receive said indicator of the load of said cell from said radio access network.

According to one embodiment, said indicator expresses the amount of unused resources for said cell as a fraction of the total amount of resources for said cell.

According to one embodiment, said estimating comprises estimating a round trip time in a cell of said radio access network; and said comparison comprises a comparison of said estimated round trip time against an actual round trip time via said access point.

According to one embodiment, the memory and computer program code are further configured to, with the processor, cause the apparatus to: in the event of a transfer of said communication device from said access point to said radio access network, send from said communication device to said radio access network information about the actual quality of service achieved via said access point.

According to one embodiment, the memory and computer program code are further configured to, with the processor, cause the apparatus to: in the event of a decision at said communication device to transfer said communication device from said access point to said radio access network, send from said communication device to said radio access network an indication that a request to transfer back to said radio access network is based on a comparison of said estimated quality of service against a quality of service achieved via said access point.

According to one embodiment, said radio access network and said access point operate according to different radio access technologies.

There is also hereby provided an apparatus comprising: a processor and memory including computer program code, wherein the memory and computer program code are configured to, with the processor, cause the apparatus to: in a technique comprising making a decision at a communication device about when to transfer to a radio access network from an access point operating outside of the radio access network at least partly based on a indicator from the radio access network about the amount of resources available to said communication device via said cell: decide at said radio access network on a value for said indicator at least partly with reference to feedback received at the radio access network about the actual quality of service provided by said access point.

According to one embodiment, the memory and computer program code are further configured to, with the processor, cause the apparatus to determine from said feedback that said access point is not suitable for a handover; and set said indicator to a value that is recognised by said communication device as an indication that said communication device is not to handover to said access point.

There is also hereby provided an apparatus comprising: a processor and memory including computer program code, wherein the memory and computer program code are configured to, with the processor, cause the apparatus to: in a technique comprising making a decision at a communication device about when to transfer to a radio access network from an access point operating outside of the radio access network at least partly based on an estimate at the communication device of a quality of service available to said communication device via said radio access network: transmit from said radio access network to said communication device signalling regarding a handover of said communication device from said radio access network to said access point, wherein said signalling is based on information received at the radio access network about past levels of quality of service achieved via said access point.

There is also hereby provided a computer program product comprising program code means which when loaded into a computer controls the computer to: estimate at a communication device a quality of service available to said communication device via a radio access network; make a comparison of the estimated quality of service against a quality of service currently achieved via an access point operating outside of the radio access network; and decide whether or not to transfer from said access point to said radio access network at least partly with reference to the result of said comparison.

There is also hereby provided a computer program product comprising program code means which when loaded into a computer controls the computer to: in a technique comprising making a decision at a communication device about when to transfer to a radio access network from an access point operating outside of the radio access network at least partly based on a indicator from the radio access network about the amount of resources available to said communication device via said cell: decide at said radio access network on a value for said indicator at least partly with reference to feedback received at the radio access network about the actual quality of service provided by said access point.

There is also hereby provided a computer program product comprising program code means which when loaded into a computer controls the computer to: in a technique comprising making a decision at a communication device about when to transfer to a radio access network from an access point operating outside of the radio access network at least partly based on an estimate at the communication device of a quality of service available to said communication device via said radio access network: transmit from said radio access network to said communication device signalling regarding a handover of said communication device from said radio access network to said access point, wherein said signalling is based on information received at the radio access network about past levels of quality of service achieved via said access point.

Embodiments of the present invention are described in detail hereunder, by way of example only, with reference to the accompanying drawings, in which.

Figure 1:
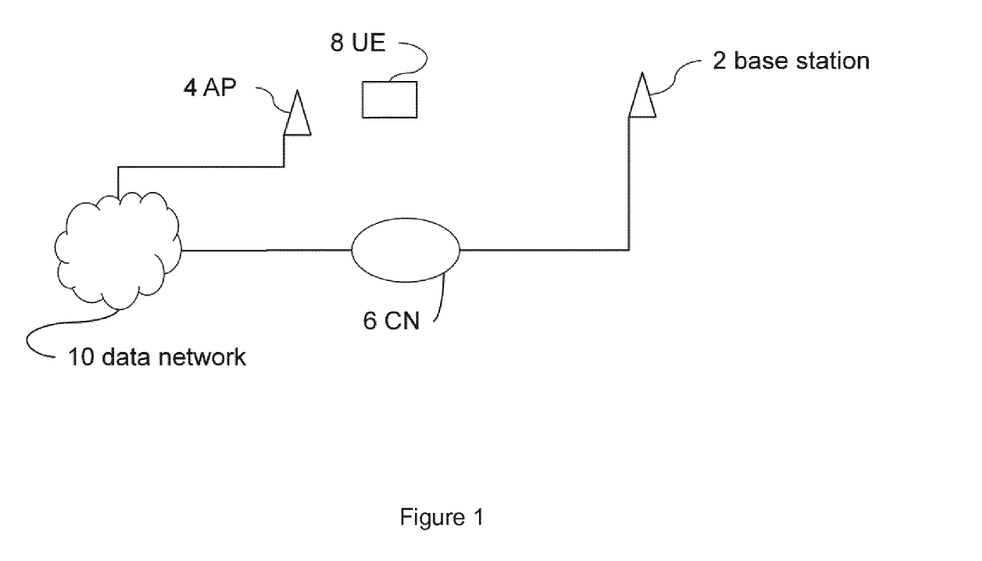
FIG. 1 illustrates a mobile communication device in a geographical location within both the radio coverage of a base transceiver station (BTS) of a cellular radio access network and the radio coverage of an access point of a wireless local access network (WLAN) operated independently of the cellular radio access network.

Embodiments of the invention are described in detail below, by way of non-limiting example only, in the context of a mobile communication device in a geographical location within the radio coverage of at least one base transceiver base station 2 of a 3GPP cellular radio access network (such as a UMTS Radio Access Network (UTRAN) or an evolved UTRAN (EUTRAN) according to an LTE standard), and at least one WiFi access point (AP) 4 operated outside of the radio access network. An access point operating outside of the radio access network means an access point that is not subject to the handover mechanisms that apply to handovers between cells of the cellular radio access network. The access point may or may not share an operator with the radio access network; and the access point may or may not be physically integrated with the radio access network.

A BTS 2 of a cellular network typically operates a plurality of 3GPP cells. The coverage area of each 3GPP cell depends on the transmission power and the directionality of the antenna by which the 3GPP cell is operated; but the coverage area of each 3GPP cell operated by the BTS is typically significantly much wider than the coverage area of the WiFi access point 4. A 3GPP cellular radio access network typically comprises thousands of BTSs 2.

As illustrated in FIG. 1, both the WiFi AP 4 and the BTS 2 of the cellular radio access network provide access to a data network 10 e.g. the internet 10. In the case of the BTS 2 of the cellular radio access network, the access to the internet 10 is via at least a core network (CN) 6. In the case of UTRAN, the access is via a radio network controller (RNC) (not shown) and CN 6. BTSs are also referred to as NodeBs or eNodeBs for UTRAN and EUTRAN, respectively.

Mobile communication device 8 also denoted as user equipment (UE), and BTS 2 may have one or more radio channels open at the same time and may send signals to and/or receive signals from more than one source.

Figure 2:
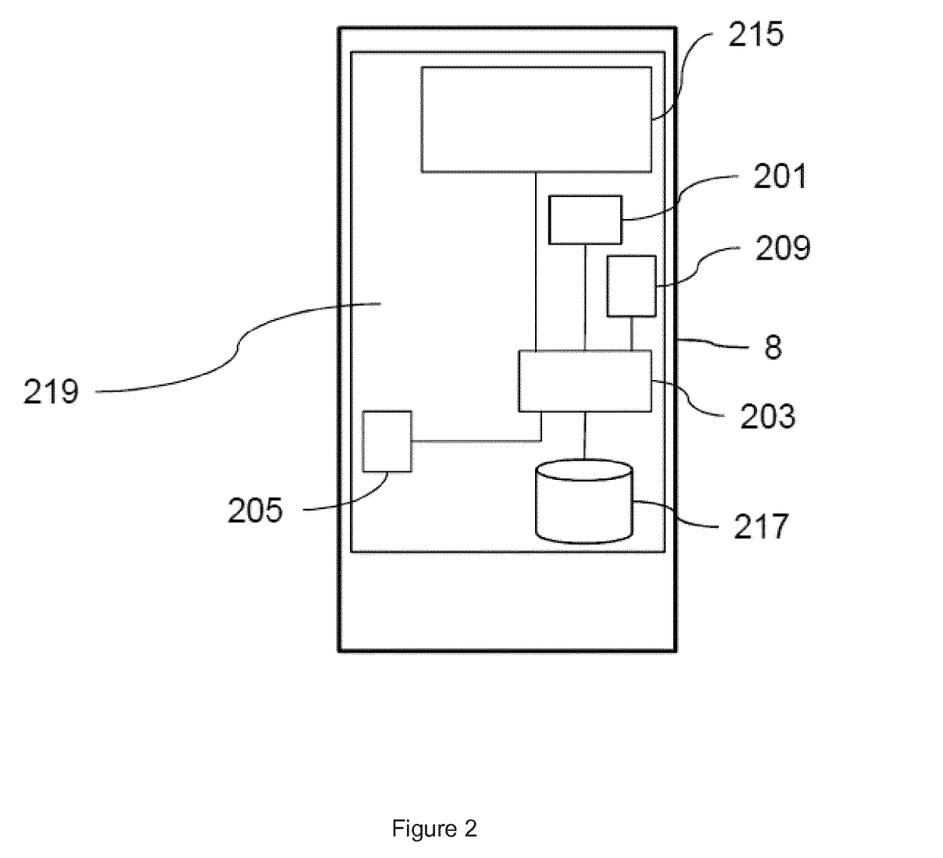
FIG. 2 illustrates an example of apparatus for use at the mobile communication device in FIG. 1.

FIG. 2 shows a schematic view of an example of user equipment 8 that may be used for communicating with the BTS and AP of FIG. 1 via a wireless interface. UE 8 may be used for various tasks such as making and receiving phone calls, for receiving and sending data from and to a data network and for experiencing, for example, multimedia or other content.

There are various different radio access techniques by which cellular radio access networks provide access to UEs, including: =code division multiple access (CDMA), or wideband CDMA (WCDMA). Other examples include time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

The UE 8 may be any device capable of at least sending or receiving radio signals to or from the BTS 2 and AP 4 of FIG. 1. Non-limiting examples include a mobile station (MS), a portable computer provided with a wireless interface card or other wireless interface facility, personal data assistant (PDA) provided with wireless communication capabilities, or any combinations of these or the like. The UE 8 may communicate via an appropriate radio interface arrangement 205 of the UE 8. The interface arrangement 205 may be provided for example by means of a radio part and associated antenna arrangement. The antenna arrangement may be arranged internally or externally to the UE 8, and may include a plurality of antennas capable of operating in the kind of multi-layer transmission scheme described below. The radio-interface arrangement may operate according to one or more radio transmission techniques in parallel, e.g., according to 3GPP GSM, GPRS, EDGE, UMTS, HSDPA, HSPA; LTE, CDMA, WiMAX, wireless LAN, Wi-Fi specifications.

The UE 8 may be provided with at least one data processing entity 203 and at least one memory or data storage entity 217 and other possible components 209 for use in software and hardware aided execution of tasks it is designed to perform. The data processor 203, memory 217 and other possible components 209 may be provided on an appropriate circuit board 219 and/or in chipsets.

The user may control the operation of the UE 8 by means of a suitable user interface such as key pad 201, voice commands, touch sensitive screen or pad, combinations thereof or the like which may be considered examples of other components 209. A display 215, a speaker and a microphone may also be provided and are further examples of other components 209. Furthermore, the UE 8 may comprise appropriate connectors (either wired or wireless), which may be further components 209, to other devices and/or for connecting external accessories, for example hands-free equipment, thereto.

Figure 3:
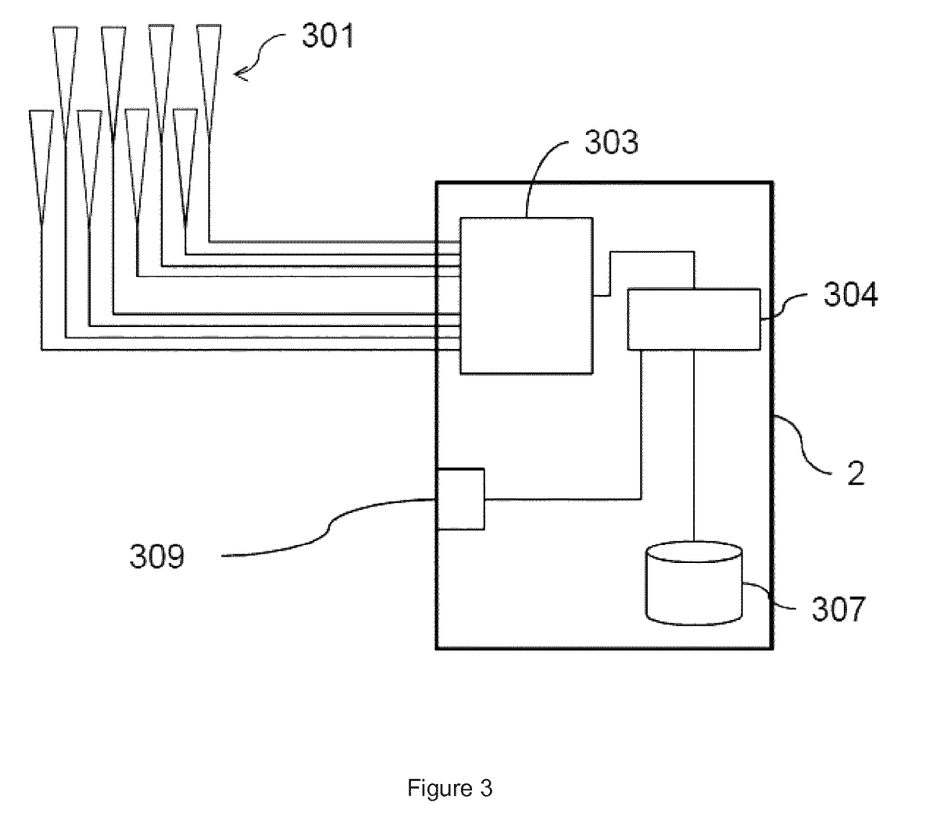
FIG. 3 illustrates an example of apparatus for use at the BTS in FIG. 1.

FIG. 3 shows an example of apparatus for use at the BTS 2 of FIG. 1. The apparatus comprises a radio frequency antenna array 301 configured to receive and transmit radio frequency signals; radio frequency interface circuitry 303 configured to interface the radio frequency signals received and transmitted by the 8-antenna array 301 and the data processor 306. The radio frequency interface circuitry 303 may also be known as a transceiver. The apparatus also comprises an interface 309 via which it can send and receive information to and from one or more other network nodes. The data processor 306 is configured to process signals from the radio frequency interface circuitry 303, control the radio frequency interface circuitry 303 to generate suitable RF signals to communicate information to the UE 8 via the wireless communications link, and also to exchange information with other network nodes via the interface 309. The memory 307 is used for storing data, parameters and instructions for use by the data processor 306.

It would be appreciated that the apparatus shown in each of FIGS. 2 and 3 described above may comprise further elements which are not directly involved with the embodiments of the invention described hereafter.

An embodiment of the invention is described in detail below, by way of example only, for a mobile communication device (UE) 8 that has transferred from being served by a 3GPP cell operated by BTS 2 to being served by WiFi AP 4 (STEP 404 of FIG. 4). There are a number of mechanisms by which such a transfer can be managed, and the technique described below for managing transfer back to the 3GPP cell from the WiFi AP 4 can be used regardless of which mechanism is used to manage the transfer of UE 8 from the 3GPP cell to AP 4.

A transfer from a 3GPP cell to a WiFi access point can be referred to as a vertical handover because it is a handover between a BTS and AP operating according to different radio access technologies. In contrast, handovers between 3GPP cells can be referred to as horizontal handovers.

Figure 4:
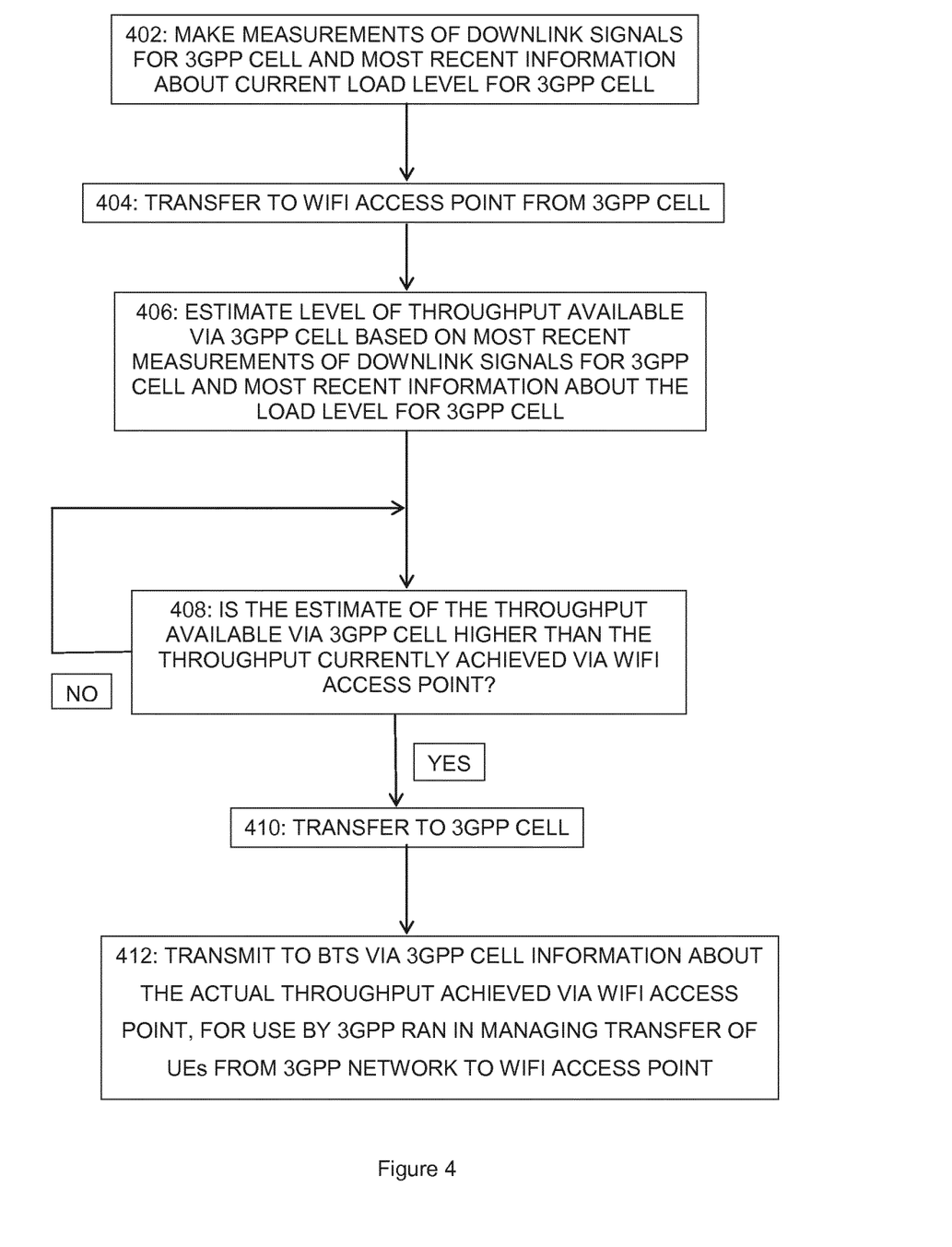
FIG. 4 illustrates an example of operations at the mobile communication device of FIG. 1 in accordance with an embodiment of the present invention.

When still served by the 3GPP cell and before the transfer to AP 4, UE 8 would have made measurements of downlink signals transmitted via that 3GPP cell, and would have received via that 3GPP cell information about the current load level for that 3GPP cell (STEP 402 of FIG. 4). UE 8 estimates the level of throughput (data bits per second) available via the 3GPP cell from (i) an estimate of the quality of a downlink channel for the 3GPP cell based on the most recent measurements of downlink signals transmitted via the 3GPP cell; and (ii) the most recent information received from BTS 2 about the load level for the 3GPP cell (STEP 406 of FIG. 4).

The information received from BTS 2 about the load level for the 3GPP cell can take the form of a load factor having a value ranging from 0 (full load) to 1 (no load). The load factor expresses the current level of unused resources for the 3GPP cell as a fraction of the total amount of resources for the 3GPP cell. UE 8 arrives at an estimate of the throughput available via the 3GPP cell by multiplying the CQI value by the load factor. A good estimate of the throughput available via the 3GPP cell can be derived from a combination of (i) a channel quality indicator (CQI) derived from said measurements of downlink signals transmitted via the 3GPP cell; and (ii) said load factor. For the example of an LTE access network, channel state information (CSI) could be used instead of CQI. CSI contains CQI and also Rank Indication (RI) and Precoding Matrix Indication (PMI).

Since the CQI or CSI measured by UE 8 corresponds to a data rate for the case where all the resources in the 3GPP cell would be available for the single UE 8, scaling of the measured CQI or CSI using information from the 3GPP access network about limitations on the amount of resources available to UE 8 (by, for example, using the load factor mentioned above) serves to provide an estimate that takes into account the impact of other UEs using the 3GPP cell (system loading) and other limitations on the amount of resources available to UE 8 via the 3GPP cell. A scaling factor (e.g. load factor) of 1 applies where the UE could get the data rate indicated by the measured CQI or CSI, whereas a scaling factor of zero applies where there is a very heavy limitation on the 3GPP cell resources available to UE 8. Different traffic/quality classes could have different scaling factors for the same cell load.

UE 8 then compares the estimate of throughput available via the 3GPP cell against the actual throughput currently achieved via the WiFi AP 4 (STEP 408 of FIG. 4). If the result of this comparison is that the estimate of throughput available via the 3GPP cell is found to be higher than the throughput currently achieved via WiFi AP 4, UE 8 transfers back to the 3GPP cell (STEP 410 of FIG. 4). On the other hand, if the result of the comparison is that the estimate of throughput available via the 3GPP cell is found to be no higher than the throughput currently achieved via WiFi AP 4, UE 8 continues to be served by WiFi AP 4, and repeats the comparison of STEP 408 at periodic intervals. Alternatively, where it is desirable that the UE remains served by the WiFi AP 4 even at the expense of some reduction in throughput, UE can be configured to only transfer back to the 3GPP cell if it is found that the throughput achieved via the WiFi AP 4 is lower than the estimated throughput achievable via the 3GPP cell by more than an amount (delta), whose value has been communicated to the UE from the radio access network before the UE transferred to the WiFi AP 4.

In another variant, instead of the throughput the UE may also compare an estimate of the RTT for the 3GPP cell against the actual RTT for the WiFi AP 4.

During transfer back to the 3GPP cell, the UE 8 may additionally indicate during connection establishment with the 3GPP cell a reason why transfer back is requested. The reason may be indicated by a cause value, which may indicate that the reason for transfer back from the access node is because the desired Quality of Service has not been achieved, and/or because specific criteria such as throughput and/or RTT have not been met. The BTS 2 or other network node may evaluate the cause value indicated by UE 8; and depending on the reason for transfer back, may trigger additional actions in the radio access network such as, for example, prioritizing the attachment procedure or resource reservations for the UE 8, or checking whether there happens to still be an outstanding reservation of resources for the attaching UE 8, which has not yet been cancelled. One example of a cause value that would trigger these additional actions may be a cause value indicating that a transfer back is requested because a pre-defined QoS threshold has not been reached via the WiFi AP 4.

Additionally, after UE 8 transfers back to the 3GPP cell, UE 8 provides BTS 2 with information about the actual throughput achieved via the WiFi AP 4 (STEP 412 of FIG. 4). This information can be used by the 3GPP radio access network to manage the transfer of the same UE 8 or other UEs being served by BTS 2 to WiFi AP 4. For example, if the feedback from a significant number of UEs transferred back from WiFi AP 4 to the 3GPP cell indicates that the quality of service provided by WiFi AP 4 is poor, the 3GPP radio access network could select for the above-mentioned scaling factor (e.g. load factor) a predetermined value (e.g. 1) that is recognised by UEs as an indicator that UE 8 should not transfer to WiFi AP 4. Alternatively, such indication could be provided by other signalling from the BTS 2 to UE 8.

In some radio access networks such as a WCDMA/HSPA network, a large amount of signalling traffic is not desirable, since it increases the network load, and also places a computational burden on, for instance, the radio resource management entities of the network (such as the radio network controller (RNC) of UTRAN). Where the criteria for the transfer of a UE from the radio access network to the WiFi AP 4 are decided at a network entity other than the BTSs, one option is for the feedback provided by UEs about the actual throughput achieved via the WiFi AP 4 to be collected at the BTS over a short period, and for a summary of the feedback for that short period to be prepared and sent from the BTS to the deciding entity.

For the example of UTRAN, the deciding entity could be the RNC, which could communicate the criteria (one or more parameters) to the UE by the RRC protocol. Alternatively, the nodeB of UTRAN is given the task to decide the criteria (i.e. configure the parameters) for a transfer of the UE 8 to the WiFi AP 4.

For the example of an LTE network (EUTRAN), the deciding of the criteria (i.e. setting of the parameters) for the transfer of a UE to WiFi AP 4 may be performed at a centralized unit, in similar fashion to self-organizing network operation, or may be performed at the BTS (eNodeB).

The above-described technique has the advantage that transfers from a WiFi access point to a 3GPP cell can be efficiently managed without the need for communication between the WiFi access point and the resource management entity of the 3GPP radio access network. Another advantageous characteristic of the above-described technique is that the criteria by which transfer back to the 3GPP cell is decided takes into account the actual location of the UE (by using most recent measurements of downlink signals transmitted via the 3GPP cell). This is significant because the quality of service available to a UE can depend significantly on whether the UE is located at a part of the WiFi access point coverage closest to the BTS 2 or at a part of the WiFi access point coverage furthest from the BTS 2.

The above-described operations may require data processing in the various entities. The data processing may be provided by means of one or more data processors, and memory. Similarly various entities described in the above embodiments may be implemented within a single or a plurality of data processing entities and/or data processors. Appropriately adapted computer program code product may be used for implementing the embodiments, when loaded to a computer. The program code product for providing the operation may be stored on and provided by means of a carrier medium such as a carrier disc, card or tape. A possibility is to download the program code product via a data network. Implementation may be provided with appropriate software in a server.

For example the embodiments of the invention may be implemented as a chipset, in other words a series of integrated circuits communicating among each other. The chipset may comprise microprocessors arranged to run code, application specific integrated circuits (ASICs), or programmable digital signal processors for performing the operations described above.

Embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the modifications explicitly mentioned above, it will be evident to a person skilled in the art that various other modifications of the described embodiment may be made within the scope of the invention.

The acronyms used above are explained below:
3GPP 3$^{rd}$ generation partnership project;
CDMA Code Division Multiple Access;
EDGE Enhanced Data rates for GSM Evolution;
GSM Global System for Mobile Communications;
GPRS General Packet Radio Services;
HSDPA High Speed Downlink Packet Access;
HSPA High Speed Packet Access;
IEEE Institute of Electrical and Electronics Engineers
LTE Long Term Evolution;
UMTS Universal Mobile Telecommunication System;
WiMAX Worldwide Interoperability for Microwave Access;
Wi-Fi wireless local area network (WLAN), according to IEEE 802.11 standards;

The invention claimed is:

1. A method, comprising:
    estimating at a communication device a quality of service available to said communication device via a radio access network;
    making a comparison by the communication device of the estimated quality of service against a quality of service currently achieved via an access point operating outside of the radio access network;
    deciding by the communication device whether or not to transfer from said access point to said radio access network at least partly with reference to the result of said comparison, wherein deciding further comprises deciding by the communication device to transfer from said access point to said radio access network only if the estimated quality of service is higher than the quality of service currently achieved via said access point by at least a predetermined amount, and wherein information about said predetermined amount is received by the communication device from the radio access network.

2. A method according to claim 1, wherein said estimating comprises estimating a level of throughput available to a communication device via a cell of said radio access network; and said comparison comprises a comparison of said estimated throughput level against a throughput level currently achieved via said access point.

3. A method according to claim 2, wherein said estimating a level of throughput available to a communication device is at least partly based on (a) measurements at said communication device of the quality of a downlink via said cell of said radio access network and (b) an indicator of the amount of resources available to UE via said cell.

4. A method according to claim 2, wherein said estimating a level of throughput available to a communication device is at least partly based on (a) measurements at said communication device of the quality of a downlink via said cell of said radio access network and (b) an indicator of the load of said cell.

5. A method according to claim 4, further comprising receiving said indicator of the load of said cell from said radio access network.

6. A method according to claim 5, wherein said indicator expresses the amount of unused resources for said cell as a fraction of the total amount of resources for said cell.

7. A method according to claim 1, wherein said estimating comprises estimating a round trip time in a cell of said radio access network; and said comparison comprises a comparison of said estimated round trip time against an actual round trip time via said access point.

8. A method according to claim 1, further comprising: in the event of a transfer of said communication device from said access point to said radio access network, sending from said communication device to said radio access network information about the actual quality of service achieved via said access point.

9. A method according to claim 1, further comprising: in the event of a decision at said communication device to transfer said communication device from said access point to said radio access network, sending from said communication device to said radio access network an indication that a request to transfer back to said radio access network is based on a comparison of said estimated quality of service against a quality of service achieved via said access point.

10. A method according to claim 1 wherein said radio access network and said access point operate according to different radio access technologies.

11. An apparatus comprising:
    a processor and memory including computer program code, wherein the memory and computer program code are configured to, with the processor, cause the apparatus to:

estimate at a communication device a quality of service available to said communication device via a radio access network;

make a comparison by the communication device of the estimated quality of service against a quality of service currently achieved via an access point operating outside of the radio access network;

decide by the communication device whether or not to transfer from said access point to said radio access network at least partly with reference to the result of said comparison, wherein the deciding comprises deciding by the communication device to transfer from said access point to said radio access network only if the estimated quality of service is higher than the quality of service currently achieved via said access point by at least a predetermined amount, and wherein information about said predetermined amount is received by the communication device from the radio access network.

12. An apparatus according to claim 11, wherein said estimating comprises estimating a level of throughput available to a communication device via a cell of said radio access network; and said comparison comprises a comparison of said estimated throughput level against a throughput level currently achieved via said access point.

13. An apparatus according to claim 12, wherein said estimating a level of throughput available to a communication device is at least partly based on (a) measurements at said
communication device of the quality of a downlink via said cell of said radio access network and (b) an indicator of the amount of resources available to UE via said cell.

14. An apparatus according to claim 12, wherein said estimating a level of throughput available to a communication device is at least partly based on (a) measurements at said communication device of the quality of a downlink via said cell of said radio access network and (b) an indicator of the load of said cell.

15. An apparatus according to claim 14, wherein the memory and computer program code are further configured to, with the processor, cause the apparatus to receive said indicator of the load of said cell from said radio access network.

16. An apparatus according to claim 15, wherein said indicator expresses the amount of unused resources for said cell as a fraction of the total amount of resources for said cell.

17. An apparatus according to claim 11, wherein said estimating comprises estimating a round trip time in a cell of said radio access network; and said comparison comprises a comparison of said estimated round trip time against an actual round trip time via said access point.

18. An apparatus according to claim 11, wherein the memory and computer program code are further configured to, with the processor, cause the apparatus to: in the event of a transfer of said communication device from said access point to said radio access network, send from said communication device to said radio access network information about the actual quality of service achieved via said access point.

19. An apparatus according to claim 11, wherein the memory and computer program code are further configured to, with the processor, cause the apparatus to: in the event of a decision at said communication device to transfer said communication device from said access point to said radio access network, send from said communication device to said radio access network an indication that a request to transfer back to said radio access network is based on a comparison of said estimated quality of service against a quality of service achieved via said access point.

20. An apparatus according to claim 11 wherein said radio access network and said access point operate according to different radio access technologies.

21. A computer program product comprising a non-transitory computer readable medium comprising program code which when loaded into a computer controls the computer to:

estimate at a communication device a quality of service available to said communication device via a radio access network;

make by the communication device a comparison of the estimated quality of service against a quality of service currently achieved via an access point operating outside of the radio access network;

decide by the communication device whether or not to transfer from said access point to said radio access network at least partly with reference to the result of said comparison, wherein deciding further comprises deciding by the communication device to transfer from said access point to said radio access network only if the estimated quality of service is higher than the quality of service currently achieved via said access point by at least a predetermined amount, and wherein information about said predetermined amount is received by the communication device from the radio access network.

* * * * *